United States Patent [19]

Oishi

[11] Patent Number: 4,789,916
[45] Date of Patent: Dec. 6, 1988

[54] MAGNETIC DISK CARTRIDGE

[75] Inventor: Kengo Oishi, Kanagawa, Japan

[73] Assignee: Fuji Photo Film Co., Ltd., Kanagawa, Japan

[21] Appl. No.: 100,866

[22] Filed: Sep. 25, 1987

[30] Foreign Application Priority Data

Sep. 25, 1986 [JP] Japan .......................... 61-147016[U]

[51] Int. Cl.⁴ .......................................... G11B 23/033
[52] U.S. Cl. ..................................................... 360/133
[58] Field of Search .......................................... 360/133

[56] References Cited

U.S. PATENT DOCUMENTS

| | | | |
|---|---|---|---|
| 4,626,949 | 12/1986 | Brock et al. | 360/133 |
| 4,630,728 | 12/1986 | Matsumoto et al. | 360/133 |
| 4,677,517 | 6/1987 | Gelardi et al. | 360/133 |
| 4,737,876 | 4/1988 | Brock et al. | 360/133 |
| 4,739,433 | 4/1988 | Dishi | 360/133 |

Primary Examiner—Robert S. Tupper
Attorney, Agent, or Firm—Sughrue, Mion, Zinn, Macpeak, and Seas

[57] ABSTRACT

A magnetic disk cartridge comprises a disk case, a magnetic disk rotatably disposed in the disk case, and liner members secured to inner surfaces of the disk case to face circular surfaces of the magnetic disk so that the liner members rotatably support the magnetic disk. A concentric rib and an eccentric rib are formed at least on the inner surface of the disk case facing the circular surface of the magnetic disk on the magnetic recording side. The concentric rib is constituted by a ring-shaped protrusion facing at least either one of an inner circumference and an outer circumference of the circular surface of the magnetic disk. The eccentric rib is constituted by a ring-shaped protrusion eccentric with respect to the center of rotation of the magnetic disk and passing through positions facing the vicinity of the outer circumference and the vicinity of the inner circumference of the circular surface of the magnetic disk.

2 Claims, 1 Drawing Sheet

U.S. Patent     Dec. 6, 1988     4,789,916
F I G. 1
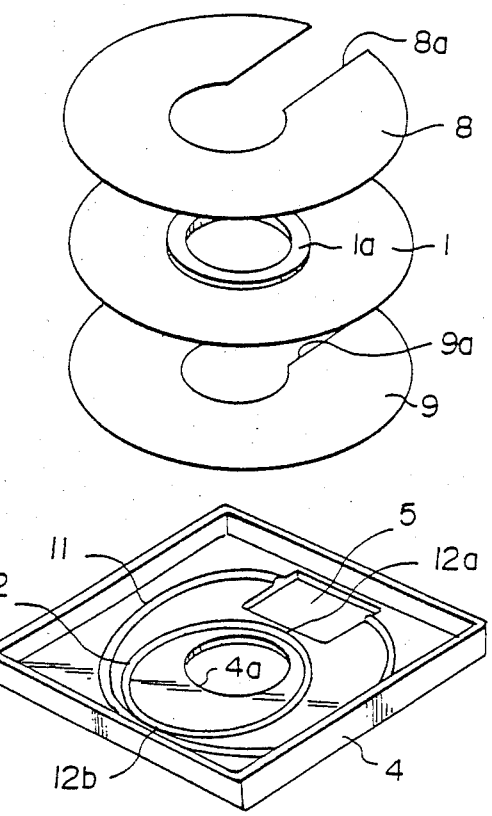
F I G. 2
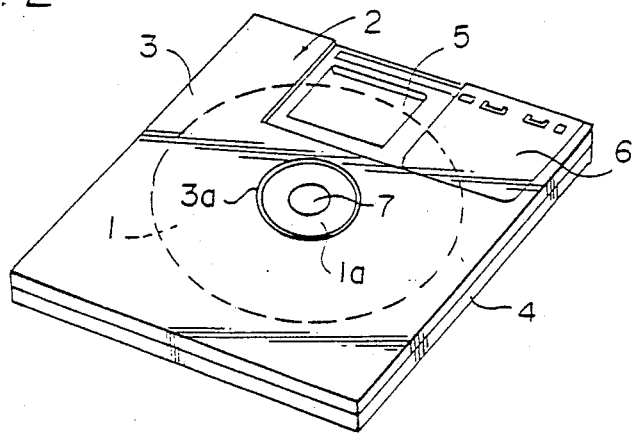

MAGNETIC DISK CARTRIDGE

BACKGROUND OF THE INVENTION

1. Field of the Invention

This invention relates to a magnetic disk cartridge comprising a disk case, and a magnetic disk rotatably supported by liner members in the disk case.

2. Description of the Prior Art

In general, magnetic disk cartridges are constituted by securing a pair of disk-like liner members formed of a nonwoven fabric respectively to inner surfaces of upper and lower case halves of a disk case, and supporting a magnetic disk rotatably with respect to the disk case by the liner members. The liner members rotatably support the magnetic disk and clean the magnetic disk by catching dust, debris or the like clinging to the surface of the magnetic disk among fibers of the nonwoven fabric while the magnetic disk is being rotated.

In order to increase the cleaning effects of the aforesaid liner members, the liner members may be pushed strongly against the surface of the magnetic disk. However, when the liner members are strongly pushed against the surface of the magnetic disk, frictional resistance between the liner members and the magnetic disk increases, and it is not always possible to rotate the magnetic disk at a high speed. Particularly, in the case where the magnetic disk is used as a video floppy disk or a high-density recording disk, the amount of information which is to be transferred is large, and the magnetic disk must be rotated at a high speed for increasing the linear speed in order to increase the transfer rate of the information. However, the requirements cannot be satisfied when the frictional resistance between the liner members and the magnetic disk is high. Another approach to the improvement of the cleaning effects of the liner members is to increase the thickness of the liner members for improving the contact condition thereof with the surface of the magnetic disk, and not to increase the contact pressure so much. However, the liner members are formed of a nonwoven fabric, and unevenness of the thickness increases markedly when the nonwoven fabric is made thick. Therefore, such thick liner members are not suitable in practice.

One approach to elimination of the aforesaid problems is to form radial ribs on the inner surfaces of the case to which the liner members are secured, thereby to clean the surfaces of the magnetic disk by the liner member portions facin the ribs, and to decrease the areas of the liner members strongly contacting the surfaces of the magnetic disk, thereby to reduce the frictional resistance of the liner members with respect to the magnetic disk. However, in this case, the contact pressure differs markedly in the direction of rotation, i.e. in the circumferential direction, of the magnetic disk, and therefore the magnetic disk vibrates in the course of rotation thereof.

SUMMARY OF THE INVENTION

The primary object of the present invention is to provide a magnetic disk cartridge wherein both the requirement for high cleaning effects of liner members and the requirement for quick rotation of the magnetic disk are satisfied.

Another object of the present invention is to provide a magnetic disk cartridge wherein both the requirement for high cleaning effects of liner members and the requirement for quick rotation of the magnetic disk are satisfied without giving rise to vibration of the magnetic disk in the course of its rotation.

The present invention provides a magnetic disk cartridge comprising a disk case, a magnetic disk rotatably disposed in said disk case, and liner members secured to inner surfaces of said disk case to face circular surfaces of said magnetic disk so that said liner members rotatably support said magnetic disk, wherein the improvement comprises the provision of, formed at least on said inner surface of said disk case facing the circular surface of said magnetic disk on the magnetic recording side:

(i) a concentric rib constituted by a ring-shaped protrusion facing at least either one of an inner circumference and an outer circumference of said circular surface of said magnetic disk, and (ii) an eccentric rib constituted by a ring-shaped protrusion eccentric with respect to the center of rotation of said magnetic disk and passing through positions facing the vicinity of said outer circumference and the vicinity of said inner circumference of said circular surface of said magnetic disk.

With the magnetic disk cartridge in accordance with the present invention, the portion of the liner member contacting the eccentric rib is pushed toward the magnetic disk and strongly contacts the surface of the magnetic disk, and therefore the liner member can reliably clean the surface of the magnetic disk. Also, since the eccentric rib is formed to pass through the positions facing the inner circumference and the outer circumference of the magnetic disk, the portion of the liner member pushed by the eccentric rib contacts and uniformly cleans the overall surface of the magnetic disk as the magnetic disk is rotated. Further, since the portions of the liner member strongly contacting the magnetic disk are only those of the liner member pushed by the eccentric rib and the concentric rib and thus are of small areas, the frictional resistance of the liner member with respect to the magnetic disk in the course of rotation of the magnetic disk is low, and the magnetic disk can easily be rotated at a high speed. Also, since the eccentric rib has a ring-shape, changes in the contact pressure, which is generated by contact of the magnetic disk with the portion of the liner member pushed by the eccentric rib, in the course of rotation of the magnetic disk are smooth, and the magnetic disk does not vibrate during rotation.

BRIEF DESCRIPTION OF THE DRAWINGS

FIG. 1 is a perspective exploded view showing an embodiment of the magnetic disk cartridge in accordance with the present invention with an upper case half removed, and FIG. 2 is a perspective view showing the assembled form of the embodiment shown in FIG. 1.

DESCRIPTION OF THE PREFERRED EMBODIMENTS

The present invention will hereinbelow be described in further detail with reference to the accompanying drawings.

Referring to FIGS. 1 and 2, a magnetic disk sheet 1 in a circular form is rotatably housed in a case 2 composed of an upper case half 3 and a lower case half 4, and a center boss 1a at the center of the magnetic disk sheet 1 is projected outward from an opening 3a of the upper case half 3 and an opening 4a of the lower case half 4.

The upper case half 3 and the lower case half 4 are provided with openings 5, 5 from which the magnetic disk sheet 1 is to be exposed to the outside of the case 2 and into which a magnetic head (not shown) is to be inserted in the course of the usage of the magnetic disk cartridge. The openings 5, 5 into which the magnetic head is to be inserted are formed at positions facing each other, and are opened and closed by a shutter 6 slideable over the case 2. Also, liner members 8 and 9 are disposed in the case 2 so that the magnetic disk sheet 1 disposed in the upper case half 3 and the lower case half 4 intervenes between the liner members 8 and 9. The liner members 8 and 9 are formed of a nonwoven fabric and are respectively provided with cutaway portions 8a and 9a corresponding to the openings 5, 5 into which the magnetic head is to be inserted, and are secured to inner surfaces of the upper case half 3 and the lower case half 4. When the magnetic disk cartridge is set in an apparatus such as a camera, the magnetic head enters one of the openings 5, 5, into which the magnetic head is to be inserted, and contacts the magnetic disk sheet 1. Also, a spindle as a member of the apparatus enters a center opening formed at the center of the center boss 1a and is engaged with the center boss 1a to rotate it. When the center boss 1a is rotated, the magnetic disk sheet 1 secured thereto also rotates. In this manner, information is recorded on the magnetic disk sheet 1 or is reproduced therefrom by means of the magnetic head. In the case where the magnetic disk sheet 1 is provided with magnetic recording layers on both surfaces, the openings 5, 5 into which the magnetic head is to be inserted are formed on the upper case half 3 and the lower case half 4 as mentioned above. On the other hand, in the case where the magnetic disk sheet 1 is provided with the magnetic recording layer only on one surface, the opening 5 into which the magnetic head is to be inserted is formed only on one of the upper case half 3 and the lower case half 4.

A concentric rib 11 constituted by a ring-shaped protrusion facing the outer circumference of the magnetic disk sheet 1, and an eccentric rib 12 constituted by a ring-shaped protrusion eccentric with respect to the center of rotation of the magnetic disk sheet 1 and passing through a portion 12a facing the inner circumference of the magnetic disk sheet 1 and a portion 12b facing the outer circumference of the magnetic disk sheet 1 are formed on the inner surface of the lower case half 4. The concentric rib 11 is disconnected at the opening 5 into which the magnetic head is to be inserted. Though only the inner surface of the lower case half 4 is shown in FIG. 1, the concentric rib and the eccentric rib of the same shapes as the concentric rib 11 and the eccentric rib 12 may be formed on the inner surface of the upper case half 3. In the case where the magnetic disk sheet 1 is provided with the magnetic recording layers on both surfaces, the concentric rib 11 and the eccentric rib 12 are formed on both the inner surfaces of the upper case half 3 and the lower case half 4. In the case where the magnetic disk sheet 1 is provided with the magnetic recording layer only on one surface, the concentric rib 11 and the eccentric rib 12 are formed at least on the inner surface of the case half facing the magnetic recording layer of the magnetic disk sheet 1.

With the aforesaid embodiment provided with the concentric rib 11 and the eccentric rib 12, the portions of the liner member 9 contacting the concentric rib 11 and the eccentric rib 12 are pushed up toward the magnetic disk sheet 1 when the liner member 9 is secured to the inner surface of the lower case half 4. Therefore, in the magnetic disk cartridge, the portions of the liner member 9 contacting the concentric rib 11 and the eccentric rib 12 strongly contact the magnetic disk sheet 1, and the other portions of the liner member 9 weakly contact or do not contact the magnetic disk sheet 1. Accordingly, the area of strong contact of the magnetic disk sheet 1 with the liner member 9 is small, and the frictional resistance therebetween decreases. As a result, the magnetic disk sheet 1 can easily be rotated at a high speed. Also, since the eccentric rib 12 is a ring-shaped rib passing through the portion 12a facing the inner circumference of the magnetic disk sheet 1 and the portion 12b facing the outer circumference thereof, the portion of the liner member 9 pushed up by the eccentric rib 12 and strongly contacting the magnetic disk sheet 1 sequentially contacts and efficiently cleans the overall surface of the magnetic disk sheet 1 as the magnetic disk sheet 1 is rotated. Further, since the eccentric rib 12 is formed in a ring-like shape, changes in the contact pressure in the direction of rotation of the magnetic disk sheet 1 in the course of the rotation of the magnetic disk sheet 1 are smooth, and the magnetic disk sheet 1 does not vibrate in the course of the rotation thereof In the aforesaid embodiment, the concentric rib 11 is formed to face the outer circumference of the magnetic disk sheet 1. However, a concentric rib may be formed to face the inner circumference of the magnetic disk sheet 1, or two concentric ribs facing the inner circumference and the outer circumference of the magnetic disk sheet 1 may be provided.

Also, instead of forming the concentric rib 11 and the eccentric rib 12 on the inner surface of the lower case half 4 and pushing the liner member 9 at the ribs 11 and 12, the concentric rib and the eccentric rib may be formed by embossing on the liner member, and the liner member formed in this manner may be secured to a flat inner surface of a case half. Also in this case, the same effects as the aforesaid embodiment can be obtained.

I claim:

1. A magnetic disk cartridge comprising a disk case, a magnetic disk rotatably disposed in said disk case, and liner members secured to inner surfaces of said disk case to face circular surfaces of said magnetic disk so that said liner members rotatably support said magnetic disk, wherein the improvement comprises the provision of, formed at least on said inner surface of said disk case facing the circular surface of said magnetic disk on the magnetic recording side:

(i) a concentric rib constituted by a ring-shaped protrusion facing at least either one of a inner circumference and an outer circumference of said circular surface of said magnetic disk, and (ii) an eccentric rib constituted by a ring-shaped protrusion eccentric with respect to the center of rotation of said magnetic disk and passing through positions facing the vicinity of said outer circumference and the vicinity of said inner circumference of said circular surface of said magnetic disk.

2. A magnetic disk cartridge as defined in claim 1 wherein said liner members are formed of a nonwoven fabric.

* * * * *